United States Patent
Cronstedt

[11] 3,761,205
[45] Sept. 25, 1973

[54] EASILY MAINTAINABLE GAS TURBINE ENGINE

[75] Inventor: Val Cronstedt, Williamsport, Pa.

[73] Assignee: Avca Corporation, Williamsport, Pa.

[22] Filed: Mar. 20, 1972

[21] Appl. No.: 236,031

[52] U.S. Cl............... 417/407, 415/122, 415/201, 415/360, 415/DIG. 001, 417/373
[51] Int. Cl............................................. F04b 17/00
[58] Field of Search................ 417/406, 407, 373; 415/122, 201, 360, DIG. 003

[56] References Cited
UNITED STATES PATENTS

| | | | |
|---|---|---|---|
| 3,271,949 | 9/1966 | Jones et al. | 415/122 |
| 2,650,060 | 8/1953 | Stalker | 415/122 |
| 2,709,567 | 5/1955 | Wood | 415/407 |
| 2,822,974 | 2/1958 | Mueller | 417/407 |
| 2,839,005 | 6/1958 | Means | 417/407 |
| 3,172,260 | 3/1965 | Chute | 415/122 |
| 3,269,317 | 8/1966 | Lattanzio et al. | 415/122 |
| 3,505,816 | 4/1970 | Wilde | 415/122 |
| 3,632,222 | 1/1972 | Cronstedt | 415/122 |

Primary Examiner—C. J. Husar
Attorney—Charles M. Hogan et al.

[57] ABSTRACT

A differential gas turbine engine is constructed so that the power module may be removed as a unit from the output gearbox. Additional features enable major hot section components to be removed for inspection or replacement without major disassembly of the engine.

13 Claims, 1 Drawing Figure

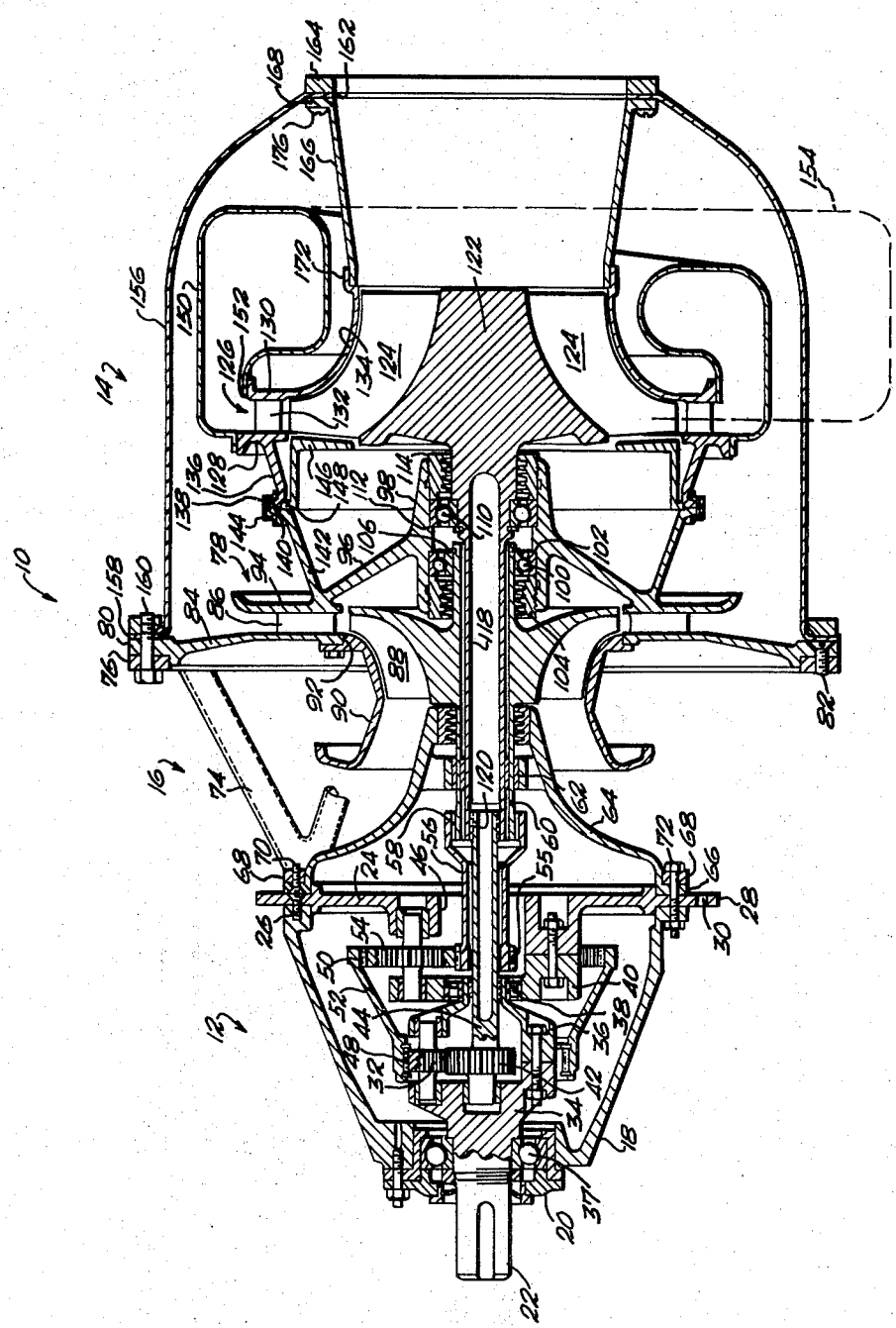

EASILY MAINTAINABLE GAS TURBINE ENGINE

The present invention relates to gas turbine engines and more particularly to structural features of these engines.

It is a common object in the gas turbine art to provide engines that allow reasonable accessibility to components of the engine that require frequent inspection and/or maintenance. This is particularly true of small gas turbine engines where the overall reduced size of the engine makes it important to provide a high degree of accessibility.

Therefore it is an objective of the present invention to provide a gas turbine engine structure allowing that high degree of maintainability without major disassembly of the engine.

The objective is achieved by a gas turbine engine which comprises an output gearbox having an aft cover; a frame structure that has a forward ring abutting the aft cover of the gearbox housing and an aft ring spaced from the forward ring. A power module includes a main support structure abutting the aft ring of the frame structure and has an outer housing abutting the main support structure. Means are provided for releasably connecting the gearbox housing, aft cover and forward ring, permitting selective removal of the gearbox from the power module without disconnecting the gearbox housing and the aft cover. Means are also provided for releasably connecting the aft ring, main support structure and outer housing, permitting selective removal of the outer housing without disconnecting the aft ring and the main support structure.

The above and other related objectives and features of the present invention will be apparent from a reading of the description of the disclosure shown in the accompanying drawing and the novelty thereof pointed out in the appended claims.

The single FIGURE illustrates a longitudinal sectional view of a gas turbine engine embodying the present invention.

Referring to the drawing, there is shown a gas turbine engine 10 comprising an output gearbox module 12, a power module 14 interconnected by a frame structure 16. The gearbox module comprises an outer generally annular housing 18 having a forward cover and bearing assembly 20 journaling a power output shaft 22. An aft cover 24 is secured to the housing 18 by a series of jury screws 26 (only one of which is shown). The heads of screws 26 are flush with the aft surface of cover 24 and threaded into the aft end of housing 18. Aft cover 24 has an outer flange 28 that may provide a primary mounting for the engine by a suitable arrangement, such as through holes 30, only one of which is shown.

A series of planet gears 32 (only one shown) are journaled on one side in a rotatable carrier 34, integral with output shaft 22 and on the other side in a rotatable carrier 36 secured to carrier 34 and journaled in bearing assemblies 38 and 37. Bearing assembly 38 is mounted in a fixed carrier 40 secured to the aft cover 24.

Planet gears 32 mesh with a turbine input gear 42 integral with a turbine input shaft 44 extending through opening 46 in the aft cover 24. A first ring gear 48 meshes with the planet gears 32 and connects with a second ring gear 50 through a conical structure 52.

Ring gear 50 meshes with a series of fixed planets 54 (only one of which is shown), suitably journaled in fixed carrier 40 on one side and the aft plate 24 on the opposite side. Planets 54 mesh with a compressor input gear 55 integral with shaft 56.

Shaft 56 is coaxial with and telescoped over the turbine input shaft 44. Shaft 56 connects through a splined connection 58 with a compressor rotor shaft 60 journaled in a bearing assembly 62 which is secured to a forward annular support structure 64. Support structure 64 has an outer flange 66 which abuts the aft end of the cover 24.

The frame assembly 16 comprises a forward ring 68 which is connected to the flange 66 by a series of jury screws 70 having their heads flush with the forward face of flange 66. The bolts 72 releasably secure the subassemblies of the housing 26, aft cover 24 and the flanges 66, 68. A series of structural V-struts 74 (only a portion of which are shown) extend from the forward ring 68 to an aft ring 76.

A main generally annular support structure, indicated by reference character 78, has an outer flange 80 abutting the aft face of ring 76. A series of jury screws 82 releasably secure the flange 80 to ring 76. The heads of the jury screws 82 are flush with the aft face of outer flange 80.

A radially extending cover 84 extends inward from outer flange 80 and provides a forward support for a series of diffuser vanes 86 adapted to receive air discharged from a centrifugal bladed impeller 88 secured on rotor shaft 60. An annular bell-mouthed shroud 90 is secured against an opening 92 in a cover 84 to provide an outer shroud for the compressor impeller and also to form an inlet in combination with the forward support structure 64. An annular flange 94 is secured to the aft ends of the diffuser vanes 86 and has an integral inwardly extending conical support 96 extending to an integral bearing support sleeve 98.

A bearing assembly 100 is telescoped into the forward end of bearing support sleeve 98 and is held against a shoulder 102 by a threaded element 104 that also functions as a seal. The compressor rotor shaft 60 is held in bearing assembly 100 by a spring clip 106, the removal of which permits the compressor rotor shaft to be pulled from the bearing assembly 100 in a forward direction.

The aft end of bearing support sleeve 98 receives a bearing assembly 110 which is held against a shoulder 112 by a threaded nut and seal assembly 114. Nut and seal assembly 114 is adapted to be unthreaded from bearing support sleeve 98 by a suitable tool engaging it from a radially outward position. Bearing assembly 110 is telescoped over a turbine shaft 118 which extends through the compressor rotor shaft 60 and connects with turbine output shaft 44 at a splined connection 120.

A bladed radial inflow turbine wheel 122 is integral with and positioned on the aft end of turbine output shaft 118. Turbine wheel 122 has a series of blades 124 receiving a hot gas stream from a nozzle assembly, generally indicated by reference character 126. The inlet nozzle assembly 126 comprises first and second radially extending walls 128 and 130, respectively, at opposite ends of a series of nozzle vanes 132. An annular turbine shroud element 134 extends from wall 130 and surrounds the periphery of the turbine blades 124. A conical support 136 extends from wall 128 and has a flange 138 abutting a flange 140 on a conical element 142 extending from element 94. A V-clamp assembly 144 releasably holds the flanges 138 and 140 together.

A segmented annular shroud 146 is positioned adjacent to the back side of the turbine blades 124 and has a flange 148 sandwiched between flanges 140 and 138. The shroud 146 may be in a number of segments but a minimum two segments to permit its radial removal when the turbine nozzle assembly 126 is removed.

A turbine inlet duct 150 having a radially inward directed annular outlet 152 is secured to walls 128 and 130. As shown in the FIGURE, the periphery of wall 130 is radially inward of the periphery of wall 128 to permit removal of duct 150 in an aft direction. Turbine inlet duct 150 receives a hot gas stream from a suitable combustor, not shown to aid in discussion of the present invention. The combustor may be in an annular form in which a hot gas stream is generated in an annular perforated chamber through the mixture of fuel and pressurized air. Alternatively, the combustor may be in a tangential form, indicated by phantom lines 154, in which a perforated can having a single outlet discharging gases tangentially into the turbine inlet duct 150. Whatever combustor form is selected is fed from air discharged from the compressor diffuser vanes 86 via an outer housing 156 which has a forward radial flange 158 abutting the aft face of the radial flange 80 of the main structure support 78. A series of screws 160 are threaded into and releasably secure flange 158 to the subassembly of the outer flange 80 and the forward ring 76.

The aft end of outer housing 156 has an opening 162 with a ring 164 surrounding it. An annular divergent turbine diffusing outlet duct 166 has a radial flange 168 abutting the aft end of housing 156. A series of screws 176 threaded into ring 164 holds flange 168 in place. The forward end of duct 166 telescopes into and is piloted by a lip 172 integral with the shroud 134 for the turbine.

The engine described operates as a differential gas turbine engine in which the compressor rotor, turbine rotor and output shaft are interconnected by means of the differential gears in the gearbox assembly 12. For a discussion of the operating characteristics of this type of engine, reference may be had to the issued U.S. Pat. Nos. 2,693,080 and 2,804,748 in the name of David W. Hutchinson, entitled "Differential Gas Turbine" and "Gas Turbine with Clutch Control", respectively.

The engine described above embodies a number of features that enable a high degree of accessibility of the components without total disassembly of the engine. If it is desired to remove the main gas generator module 14 and frame structure 16 from the gearbox module 12, threaded assemblies 72 are removed and the gearbox module 12 is removed so as to separate flange 66 and cover 24. It should be noted that the jury screws 26 and 70 maintain the structural integrity of the separated components. The splined connections 58 and 120 enable the respective shafts to be readily detached from one another.

After any fuel nozzle and combustor disassembly that may be necessary, the removal of the bolts 160 enables the outer housing 156 and exhaust duct 166 to be removed from the engine. This is done without affecting the structural integrity of the main support structure 78 and frame structure 16 because of the jury screws 82. It is pointed out that removal of the outer housing 156 and the additional hot section components described below can be accomplished without removing the gearbox module 12 from the frame 16 and power module 14. Thus, these inspections and/or replacements can take place while the engine is mounted in place on the unit it is powering.

Removal of the outer housing 156 permits the outer surface of the turbine inlet duct 150 to be inspected. The turbine inlet duct 150 may be removed from the engine in an aft direction. Since the walls 128 and 130 are at different heights, this may be done without disturbing the turbine inlet nozzle assembly 126.

Upon removal of the V-clamp 144 the turbine inlet nozzle assembly 126 and shroud 134 may be removed in an aft direction. It should be noted that the flange 138 is positioned radially outward from the tip of the turbine blades 124 to permit removal in an aft direction without the need to disconnect the turbine wheel 122. With the turbine inlet nozzle removed the split shroud ring 146 may be removed to expose the inner portion of the engine. At this point it should be noted that a major portion of the hot section components have been removed from the engine for inspection and the turbine wheel is exposed for a complete inspection without disturbing the bearing connections for any of the rotating components of the engine.

If it is desired to remove the turbine wheel 122, nut and seal element 114 is unthreaded from bearing support sleeve 98, thus permitting the turbine wheel 122 and turbine shaft 118 to be removed rearward from the engine. At this point a new turbine wheel may be readily installed without disturbing the bearing assembly for the compressor. If it is desired to remove the compressor impeller 88 or bearing assembly 100, the engine must be disassembled to the following condition: gearbox module 12 removed from frame, outer housing 156, turbine inlet duct 150, inlet nozzle 126, shroud 146, and turbine wheel 122 removed.

At this point the forward annular support structure 64 is disconnected from forward ring 68 by removing jury screws 70. The annular support 64 is then removed in a forward direction. Shroud 90 is removed from cover 84, it being noted that opening 92 is radially outward from the periphery of compressor impeller 88. This exposes the compressor impeller for inspection and/or removal. The compressor impeller is simply removed by removing the spring clip 106 which permits the compressor rotor shaft 60 to be pulled out of the bearing assembly 100 in a forward direction. The bearing assembly 100 may be removed by unthreading the nut and seal assembly 104. Building up of the engine may be accomplished in the reverse order.

The engine structure described above permits a high degree of accessibility to the important hot section components of the engine without major disassembly or disturbing any of the bearing connections. This enables repair both in the field and in the shop to take place more readily, while insuring that the running clearances will not be disturbed.

The engine structure shown above has been described particularly in connection with an engine of the differential type. It should be apparent to those skilled in the art that with some modification it may be improved with equal success to gas turbine engines that are not of this type.

Accordingly, what is claimed as novel and desired to be secured by Letters Patent of the United States is:

1. A gas turbine engine structure comprising:
   an output gearbox including a housing, at least one splined input shaft and an aft cover abutting the aft end of said gearbox housing, said cover having an opening through which said input shaft extends;

a gas generator module including a generally annular main support structure, an outer housing abutting said main support structure, and at least one rotor journaled by said annular support structure and including a splined output shaft coaxial with and releasably connectable with said gearbox input shaft, said gas generator module having an annular air inlet surrounding said output shaft;

a frame structure positioned between said gearbox and gas generator module and including: a forward ring abutting the aft cover of said gearbox housing, an aft ring abutting the main support structure of said power module and a plurality of struts extending between and structurally interconnecting said rings thereby permitting air to pass to said inlet;

means for releasably connecting said gearbox housing, aft cover and forward ring permitting selective removal of said gearbox from said engine without disconnecting said housing and said aft cover; and means for releasably connecting said aft ring, main support structure and outer housing permitting selective removal of said outer housing without disconnecting said aft ring and said main support structure.

2. A gas turbine engine structure as in claim 1 wherein said aft cover of said gearbox has a flange extending radially outward from said housing, said flange providing a primary mount for said engine.

3. A gas turbine engine structure as in claim 1 further comprising a forward generally annular support structure for journaling said rotor within said frame structure, said forward support structure being sandwiched between said aft cover and said forward ring, said forward support structure being releasably secured to said forward ring so as to permit removal from said aft cover without disconnecting said forward support structure from said forward ring.

4. A gas turbine engine structure as in claim 1 wherein said gas generator module comprises:
a bladed radial inflow turbine wheel positioned on the aft end of said rotor;
an annular turbine inlet nozzle and shroud surrounding the periphery of said turbine wheel for directing a hot gas stream in a generally inward direction relative to said turbine;
an annular turbine inlet duct directing gases into said turbine inlet nozzle and shroud, said turbine inlet duct being removable from said turbine inlet nozzle in an aft direction whereby it may be removed when said outer cover is removed; and
said turbine inlet nozzle and shroud being secured to said annular support structure radially outward from the tip of said turbine wheel so that said nozzle and shroud may be removed in an axial direction without removal of said turbine wheel.

5. A gas turbine engine structure as in claim 4 further comprising an annular shroud positioned forward of said turbine wheel, said shroud being sandwiched between said annular support structure and said turbine nozzle and split in segments whereby removal of said turbine nozzle enables removal of said shroud in a radial direction without removal of said turbine wheel.

6. A gas turbine engine structure as in claim 1 wherein:

said gas generator module has first and second independently rotatable rotors, the first rotor being telescoped over the second and both rotors having splined output shafts, said module comprising a compressor positioned on said first rotor in the forward portion of said gas generator module and journaled by said main support structure, and a turbine positioned on said second rotor and journaled aft of said compressor by said main support structure;

said output gearbox comprises an output shaft and a pair of coaxial input shafts connected to each other and to said output shaft through a differential gearing, said input shafts being splined to connect with said compressor shaft and said turbine shaft, respectively.

7. A gas turbine engine structure as in claim 6 further comprising:
a bearing assembly telescoped over and fixed on said turbine shaft, said bearing assembly being telescoped into said main support structure from an aft direction;
a retaining nut threaded into said main support structure for holding said bearing assembly therein, said threaded element being rotatable from a radial direction whereby said turbine rotor may be removed without disturbing said compressor.

8. A gas turbine engine structure as in claim 7 further comprising a compressor bearing telescoped into the forward portion of said main support structure, said compressor rotor being telescopable into said compressor bearing from a forward direction; and
a retaining clip restraining forward movement of said compressor relative to said compressor bearing assembly whereby said retaining clip may be removed when said turbine rotor is removed to permit forward removal of said compressor rotor from said main support structure.

9. A gas turbine engine structure as in claim 8 wherein said compressor bearing is telescopable against a shoulder in said main support structure from a forward direction and is held therein by a threaded element.

10. A gas turbine engine structure as in claim 9 wherein said turbine is a centripetal turbine having radially extending blades and said gas generator module comprises:
a turbine inlet nozzle and shroud surrounding the periphery of said turbine for directing gases inward across the blades of said turbine wheel;
an annular turbine inlet duct connecting with said inlet nozzle for directing a flow of hot gases therethrough;
said turbine inlet duct being removable in an aft direction without disassembly of said inlet nozzle and said inlet nozzle and shroud being supported from said annular support structure radially outward of the tip of said blades to permit removal thereof without removal of said turbine.

11. A gas turbine engine structure as in claim 10 further comprising an annular heat shield positioned adjacent the back face of said turbine, said heat shield being sandwiched between said annular support structure and said inlet nozzle and being split whereby removal of said inlet nozzle permits said heat shield to be removed in a radial direction without disassembly of said turbine.

12. A gas turbine engine structure as in claim 11 further comprising:
- a forward annular support structure positioned within said frame structure and journaling the forward portion of said compressor rotor, said forward annular support structure being sandwiched between said gearbox module aft cover and said forward ring; and
- means for releasably connecting said forward annular support structure to said forward ring so that said gearbox may be removed from said engine without disconnecting said forward annular support structure and said forward ring.

13. A gas turbine engine structure as in claim 12 wherein said releasable connecting means comprises:
- a series of jury screws connecting only said aft cover and said gearbox housing;
- a series of jury screws connecting said forward support structure and said forward ring;
- a series of jury screws connecting said annular support structure and said aft ring;
- a first set of threaded assemblies sandwiching the gearbox housing, the aft cover and the forward annular support structure, the forward ring; and
- a second set of threaded assemblies sandwiching said aft ring, said annular support structure and said outer housing.

* * * * *